Jan. 1, 1935. H. H. TALBOT 1,986,027
ROLL MOUNTING
Filed Aug. 26, 1933 2 Sheets-Sheet 1
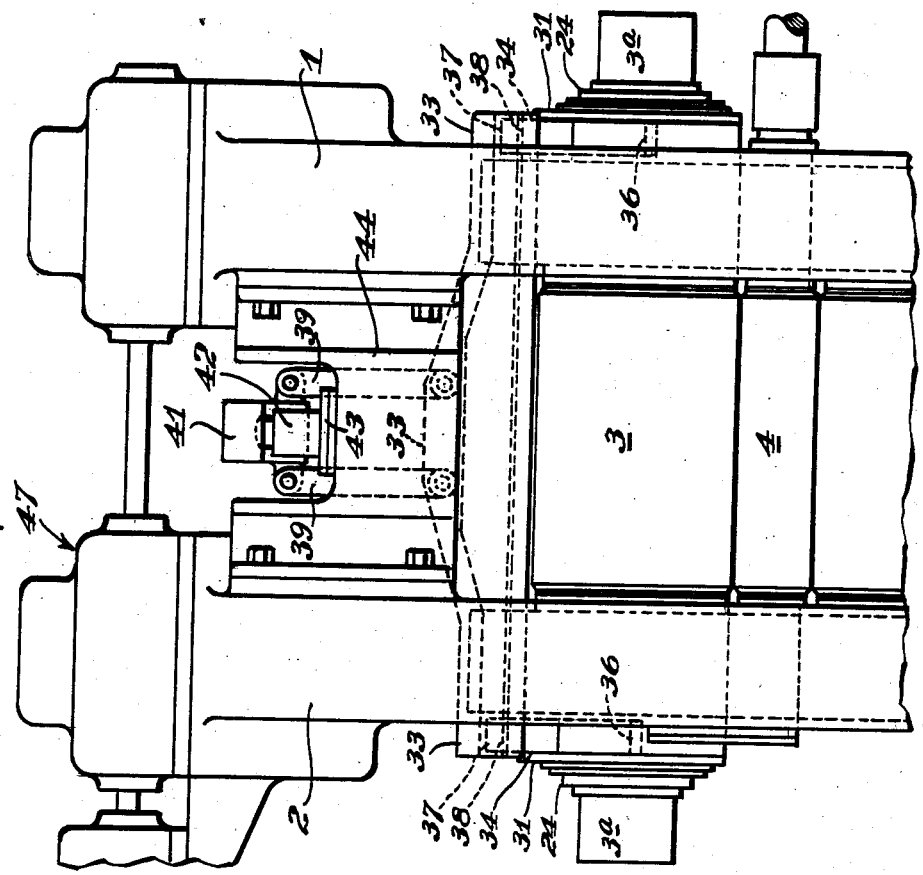
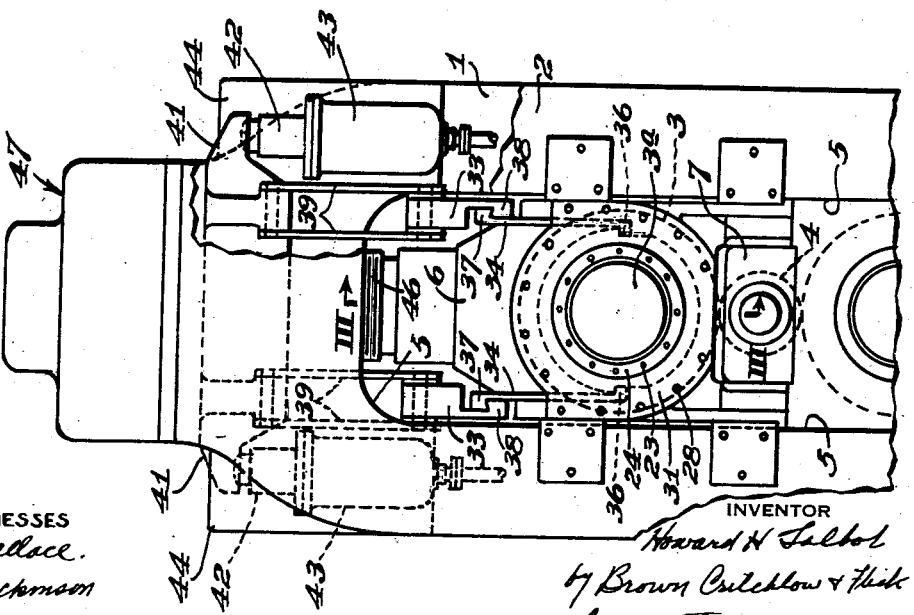
WITNESSES
INVENTOR
Howard H. Talbot
by Brown Critchlow & Flick
his Attorneys

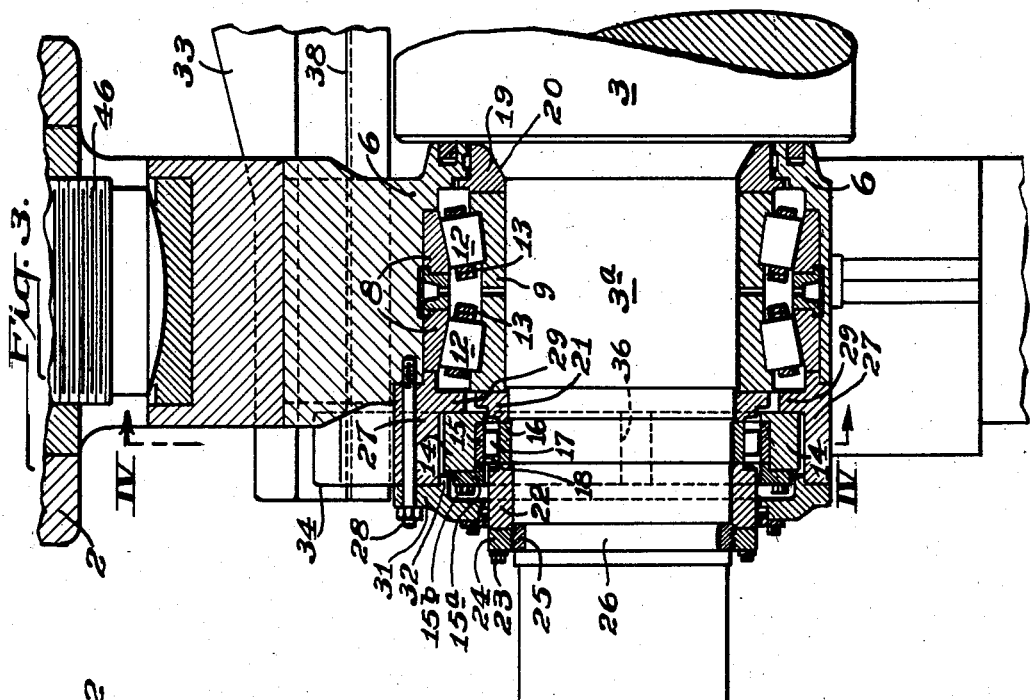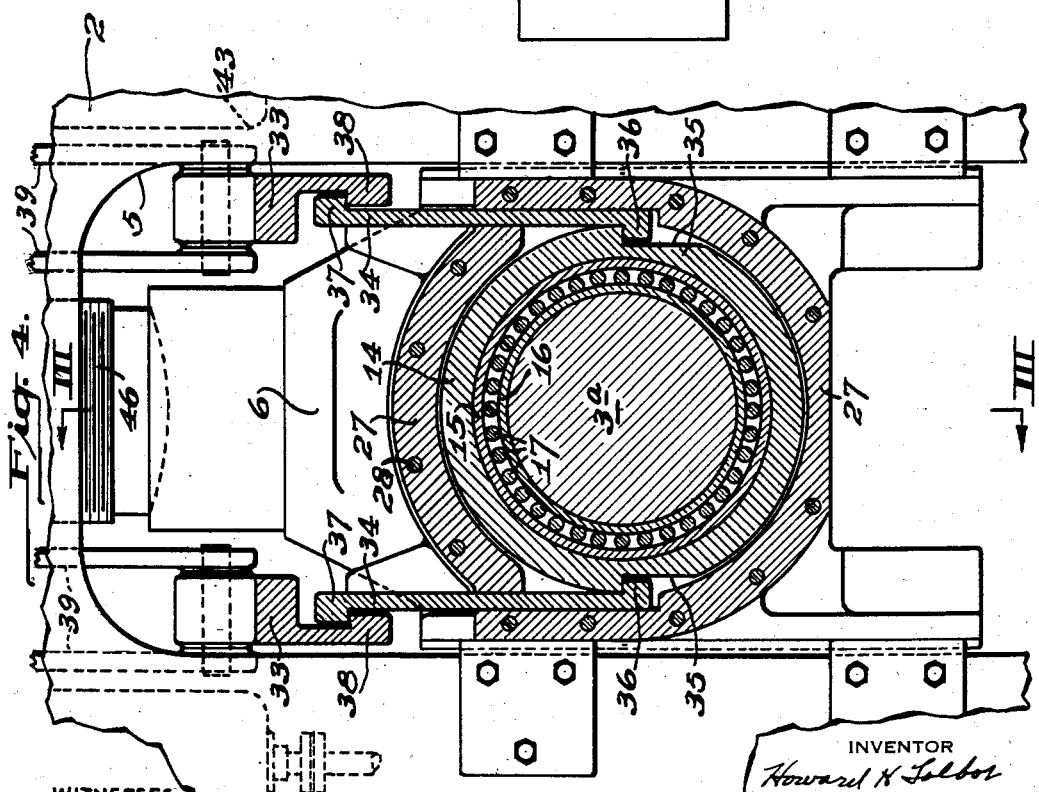

Patented Jan. 1, 1935

1,986,027

UNITED STATES PATENT OFFICE 1,986,027

ROLL MOUNTING

Howard H. Talbot, Pittsburgh, Pa., assignor to United Engineering & Foundry Company, Pittsburgh, Pa., a corporation of Pennsylvania Application August 26, 1933, Serial No. 686,930

11 Claims. (Cl. 80—55)

This invention relates to rolling mills, but has to do more particularly with the mounting of the rolls, and especially the upper rolls, although not necessarily so limited.

It is common practice in rolling mills today to use roller or other similar anti-friction bearings in the roll mountings, or in other words, on the necks of the rolls. An objection to this practice is that in such bearings there is always present a certain amount of radial play which is unavoidable in their construction. Although this is relatively small, if as a result of it the rolls are permitted to shift or hammer about in the roll mountings, the efficiency of the bearings is rapidly destroyed as well as the bearings themselves. In the upper rolls of a mill this condition presents a very serious problem as the necks of the upper rolls normally rest due to gravity on the lower surfaces of the bearings and are driven or hammered against the upper surfaces thereof if the play in the bearings is not eliminated whenever a piece of stock is entered in the mill. In variable pass mills this problem is presented in its worst form. In such mills it is the customary practice to use the upper roll chucks for moving the upper rolls to vary the mill pass and to provide means for maintaining the chucks in contact with the adjusting means to avoid hammering between such parts. However, they do not include any provisions for diminishing the play or eliminating the hammering in the bearings themselves, and, as a certain amount of play is frequently present in the movable chucks, the hammering in the bearings is not only more aggravated, but the chuck mountings are also subjected to aggravated working conditions due to the shock so permitted in the bearings.

With these difficulties in mind it is an object of this invention to provide in a roll mounting, and especially an upper roll mounting in which roller or similar anti-friction bearings are employed, for preventing any hammering action in the bearing assembly or between the bearing parts and the roll neck.

A more particular object is to provide a roll mounting employing a main anti-friction neck bearing, and in combination therewith an auxiliary anti-friction bearing, which latter is mounted in a novel fashion to carry the weight of the roll and maintain the neck thereof in constant contact with the upper part of the main bearing so as to eliminate any hammering action in the bearing assembly.

Another object is to provide a bearing assembly of the character referred to embodying the above-mentioned features, which is simple and sturdy of construction and economical to manufacture and install.

These and various other objects, as well as the various other novel features and advantages of the invention, will be apparent when the following detailed description is read in conjunction with the accompanying drawings, of which Fig. 1 is a side elevation and Fig. 2 a front elevation of the upper part of a rolling mill, including in its construction one embodiment of the invention; Fig. 3 a vertical section taken on the line III—III of Fig. 1; and Fig. 4 a vertical section taken on the line IV—IV of Fig. 3.

Referring in detail to these drawings, the numerals 1 and 2 designate the roll housings of a rolling mill, which, as far as the invention generally is concerned, may be any type of mill, although shown as a backed-up mill of the four-high type. In the windows 5 of these housings there are arranged in the customary fashion an upper backing roll 3 and working roll 4, being supported principally in main movable backing roll bearings-supporting chucks 6 and working roll chucks 7, which latter are movably supported in the lower ends of the backing roll chucks.

In accordance with this invention, as illustrated in detail in Figs. 3 and 4, a main anti-friction bearing assembly and, in the present instance, one of the roller bearing type, is mounted in each of the chucks 6 to engage the necks 3a of the upper backing roll 3. These assemblies, as shown, each includes an outer race 8, which is tightly mounted in the chucks 6, and an inner race 9, which is tightly mounted on the neck 3a of the roll 3. Between such races the rollers 12 of the bearing are arranged, being mounted in suitable retainers 13 which are employed to hold them in place.

Beyond this main bearing on an extension of the roll neck, there is provided an auxiliary chuck 14, and in it an auxiliary roller bearing assembly is mounted. This latter bearing, like the former, includes an outer race 15 which is mounted in the auxiliary chuck 14 being held in place by a ring 15a and bolts 15b and an inner race 16 which is tightly secured to the roll neck. Between these races there is arranged a set of rolls 17 which is held against endwise movement by suitable retainer rings 18.

A feature of the invention resides in the novel way the two chucks 6 and 14 are combined and the way the two bearing assemblies are associated. As illustrated, a spacing ring 19 is arranged to contact an inclined face of fillet 20 provided on the inner end of the roll neck and to abut against the inner end of the inner race 9 of the main bearing. Another spacing ring 21 is mounted between the outer end of the inner race 9 of the main bearing and the inner end of the inner race 16 of the auxiliary bearing, being adapted to permit movement of the inner bearing along the plane of contact with such spacer. On the opposite side of the inner race 16 of the auxiliary bearing, and in contact therewith, is a third spacing or retaining ring 22 which is connected at its outer end by bolts 23 to a locking ring 24 which in turn is threadably engaged on an inner multiple section ring 25 mounted in a groove 26 in the neck of the roll.

Surrounding the auxiliary chuck 14 there is provided a ring-like housing 27 which is firmly secured by bolts 28 to the main chuck 6 and adapted to abut against the outer end of the outer race 8 of the main bearing and hold it in place. Adjacent the inner end of this housing there is formed an inwardly projecting flange 29 which is adapted to engage the inner face of the auxiliary chuck 14. On the outer end of such housing ring a cover ring 31 is attached, being held in place by the bolts 28 which hold the housing ring itself in place in the main chucks, and to prevent any axial displacement of the auxiliary chuck, an annular projection 32 is provided on its inner face to extend inwardly below the housing ring 27 and engage the outer end of such chuck.

Among the objects of the auxiliary chuck 14 is the provision of means for carrying the weights of the roll 3 and for holding the roll neck engaged therein in constant contact with the upper part of the outer race 8 of the main bearing, so that no hammering will take place in the main bearing assembly, especially when a piece of material is being entered in or discharged from the mill. To accomplish this, the auxiliary chuck 14 is provided with a lesser outer diameter than the inner diameter of the housing ring 27, so that it can be lifted to raise the roll neck and slide between the flange 29 and the inner end of the projection 32 in the cover ring 28, and its bearing between the spacing rings 21 and 22.

For lifting the inner chuck 14 to raise the roll neck of the main bearing assembly so that the inner race 9 thereof may be placed in constant contact with the outer race 8, a pair of cross beams 33 is arranged in the mill housing above the upper roll 3, and connected by Z-shaped connectors 34 to diametrically opposed offsets 35 formed in the sides of the auxiliary chuck 14. As shown, these connectors 34 have oppositely disposed projections 36 and 37 on their two ends which are adapted to engage the offsets 35 in the chuck and lugs 38 provided on the lower end of the cross beams 33, such latter lugs being extended across the full length of the cross beams 33 to permit the connectors 34 to be used to guide the chucks and roll when the roll and chucks are being installed or removed from a mill and thereby facilitate such operations.

For lifting the cross beams 33, they are connected in their central portion by suitable connecting rods 39 to a cross member 41 which is extended from the back to the front of the mill above the cross beams 33 and supported at its two ends on a pair of plungers 42 mounted in a pair of hydraulically operated cylinders 43. These cylinders are mounted in saddle-like brackets 44 suitably secured to the inner faces of the roll housings 1 and 2. To operate the plunger 42 in these cylinders 43 any suitable source of fluid pressure not shown is provided.

For adjusting the roll 3, the customary screws 46 are provided, being mounted in the housings 1 and 2 to bear against the upper ends of the main chuck 6 and coupled to any suitable actuating mechanism such as that indicated generally by the numeral 47.

Among the advantages of the invention is the provision of a simple and sturdily constructed roll mounting of the type employing anti-friction bearings in which deleterious hammering within the bearings of the mounting is completely eliminated and in which the means employed for accomplishing this end are all rigidly carried by the supporting chucks for the roll. These and various other advantages will be readily apparent to those skilled in the art, as well as the fact that the construction can be materially altered without departing from the spirit of this invention, and although more especially intended for use on the upper roll of a mill, it may be applied to any roll in which vibration in the bearing is encountered, all of which is contemplated by the appended claims.

According to the provisions of the patent statutes, I have explained the principle and mode of operation of my invention, and have illustrated and described what I now consider to represent its best embodiment. However, I desire to have it understood that, within the scope of the appended claims, the invention may be practiced otherwise than as specifically illustrated and described.

I claim:

1. In a rolling mill, an upper roll provided with supporting necks, main chucks having an annular opening therein for supporting said rolls, encircling anti-friction bearings mounted in said main chucks to engage said necks, auxiliary chucks mounted on and surrounding said necks adjacent said main chucks, and means for lifting said auxiliary chucks to hold said roll necks in constant contact with the upper parts of said anti-friction bearings to eliminate hammering in said bearings.

2. In a roll mounting for the upper roll of a rolling mill, a main chuck having an opening therein for receiving and supporting the neck of a roll, a roller bearing disposed to surround the neck of a roll mounted in said chuck, an auxiliary chuck mounted adjacent said main chuck for vertical movement relative thereto, and means for lifting said auxiliary chuck to carry the load of a roll and prevent hammering between the neck of the rolls and the bearing mounted in the main chuck.

3. A roll mounting for the upper roll of a rolling mill comprising a main chuck having an opening therein for receiving and supporting the neck of a roll, an anti-friction bearing mounted in said chuck for engaging the neck of a roll, an auxiliary chuck arranged adjacent said main chuck to also engage the neck of the roll, a housing for said auxiliary chuck secured to said main chuck but adapted to permit relative vertical movement of said auxiliary chuck, and means for moving said auxiliary chuck adapting it to assume the load of the roll.

4. A roll mounting for the upper roll of a rolling mill comprising a main chuck, a roller bearing mounted in said chuck to engage the neck of a roll, an auxiliary chuck mounted for relative vertical movement adjacent said main chuck, a housing for said auxiliary chuck mounted on said main chuck and adapted to engage the bearing in said main chuck and hold it in place, and means for moving said auxiliary chuck relative to said main chuck in said auxiliary chuck housing.

5. A roll mounting for the upper roll of a rolling mill comprising a main chuck, a roller bearing mounted in said chuck to engage the neck of a roll, an auxiliary chuck mounted adjacent said main chuck, an auxiliary bearing mounted in said auxiliary chuck to also engage the neck of a roll, means for spacing said auxiliary bearing from said main bearing but disposed to allow relative movement between in their plane of contact, means for engaging the outer edge of said auxiliary bearing and the roll neck for holding the two bearings in place, and means for lifting the auxiliary bearing relative to the main chuck.

6. A roll mounting for the upper roll of a rolling mill comprising a main chuck, a roller bearing mounted in said chuck to engage the neck of the roll, an auxiliary chuck mounted adjacent said main chuck, an auxiliary roller bearing mounted in said auxiliary chuck to also engage the neck of the roll, means for spacing said auxiliary bearing from said main bearing, means for engaging the outer end of said auxiliary bearing and the roll neck for holding both of said bearings in place, a housing for said auxiliary bearing connected to said main chuck and adapted to assist in holding said bearings in place, and means for lifting said auxiliary bearing in said housing to place the roll neck thereon in constant contact with the upper part of the main bearings.

7. In a rolling mill, an upper roll provided with bearing necks, main bearing chucks for supporting said roll, roller bearings mounted in said chucks to surround said roll necks, auxiliary chucks slidably mounted adjacent said main chucks to engage said roll necks, and power means connected to said auxiliary chucks to carry the load of said roll and eliminate any play between said roll necks and the upper part of said main bearings.

8. In a rolling mill, a pair of roll housings, an upper roll provided with bearing necks mounted in said housings, main chucks adjustably mounted in windows in said housings, means for adjusting said main chucks to adjust said roll, roller bearings in said main chucks for engaging said roll necks, auxiliary chucks arranged about said roll necks adjacent said main chucks, means for lifting said auxiliary chucks to lift said roll and thereby maintain said main chucks in contact with said adjusting means and eliminate any play between said roller bearing and said main chuck at the top of the roll.

9. In a rolling mill, a pair of roll housings, an upper roll provided with bearing necks mounted in said housings, main chucks adjustably mounted in windows in said housings, roller bearings mounted in said chucks to engage said roll necks, auxiliary chucks mounted adjacent said main chucks, housings for said auxiliary chucks rigidly connected to said main chucks, means supported on said housings for lifting said auxiliary chucks in said auxiliary chuck housings to lift said roll and both maintain said roller bearings in contact with said main chucks at the top of the roll necks and said main chucks in contact with said adjusting means.

10. In a rolling mill, a pair of roll housings, an upper roll provided with bearing necks mounted in said housings, main chucks for supporting said roll adjustably mounted in windows in said housings, and surrounding the necks of the rolls, roller bearings in said chucks for engaging said roll necks, auxiliary chucks mounted on and surrounding said roll necks adjacent said main chucks, a cross beam adjustably mounted between said housings above said roll, hook-like means connecting said auxiliary chucks to said cross beam, means extending across the length of said cross beam for engaging said connecting means in such a way as to guide the end of the roll when it is installed or removed from the mill, and means for lifting said cross beam to lift said roll relative to said main chucks.

11. In a rolling mill, a pair of roll housings, an upper roll provided with bearing necks mounted in said housings, main chucks having openings therein for receiving and supporting said roll adjustably mounted in windows in said housings, auxiliary chucks mounted on and surrounding said roll necks adjacent said main chucks, a cross beam adjustably mounted between said housings above said roll, means connecting said auxiliary chucks to said cross beam, means extending across the length of said cross beam for engaging said connecting means in such a way as to guide the end of the roll when it is installed or removed from the mill, and means for lifting said cross beam to lift said roll relative to said main chucks.

HOWARD H. TALBOT.